(12) United States Patent
Kawaba

(10) Patent No.: US 8,495,434 B2
(45) Date of Patent: Jul. 23, 2013

(54) FAILURE SOURCE SERVER AND MAIL SERVER ADMINISTRATOR ALERT MANAGEMENT PROGRAMS, SYSTEMS, AND METHODS

(75) Inventor: Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/385,760

(22) Filed: Apr. 17, 2009

(65) Prior Publication Data

US 2009/0204858 A1    Aug. 13, 2009

Related U.S. Application Data

(63) Continuation of application No. PCT/JP2006/323541, filed on Nov. 27, 2006.

(51) Int. Cl.
*G06F 11/00* (2006.01)

(52) U.S. Cl.
USPC ............................................ 714/57; 709/206

(58) Field of Classification Search
USPC ................. 714/46, 47.1, 48, 49, 57; 709/206, 709/207
See application file for complete search history.

(56) References Cited

U.S. PATENT DOCUMENTS

| | | | | |
|---|---|---|---|---|
| 6,073,142 | A * | 6/2000 | Geiger et al. | 715/205 |
| 6,757,850 | B1 * | 6/2004 | Lehner | 714/48 |
| 8,001,609 | B1 * | 8/2011 | Chan et al. | 726/27 |
| 2003/0033451 | A1 * | 2/2003 | Yoshida et al. | 710/8 |
| 2003/0123100 | A1 * | 7/2003 | Tanimoto | 358/402 |
| 2004/0186694 | A1 | 9/2004 | Oya | |
| 2005/0234914 | A1 * | 10/2005 | Ishii et al. | 707/10 |

OTHER PUBLICATIONS

Patent Abstracts of Japan for Japanese Patent Publication No. 2002-236576, published Aug. 23, 2002.
Patent Abstracts of Japan for Japanese Patent Publication No. 2006-163509, published Jun. 22, 2006.
Patent Abstracts of Japan for Japanese Patent Publication No. 2004-220214, published Aug. 5, 2004.
International Search Report for International Application No. PCT/JP2006/323541, mailed Dec. 26, 2006.
"Shitei no Log o Tsuchi suru Took o Shikakeru", N+I Network, Softband Publishing Inc., Jun. 1, 2003, Vo. 3, No. 6, pp. 080-083, with English-language Translation.

* cited by examiner

*Primary Examiner* — Scott Baderman
*Assistant Examiner* — Joseph Kudirka
(74) *Attorney, Agent, or Firm* — Fujitsu Patent Center

(57) ABSTRACT

A server management system includes a management server and a mail server. The management server includes a source determination unit and an alert mail creator. The source determination unit determines as a source a symbol identifying a failure cause of a system according to the failure cause. The alert mail creator creates an alert mail with the source and with the system administrator of the system as a destination. The mail server sends the alert mail to a terminal device that the system administrator uses.

8 Claims, 17 Drawing Sheets

141 SOURCE TABLE

| FAILURE CAUSE | SOURCE |
|---|---|
| Web HARDWARE FAILURE | WEB-H |
| AP HARDWARE FAILURE | AP-H |
| DB HARDWARE FAILURE | DB-H |
| Web SOFTWARE FAILURE | WEB-S |
| AP SOFTWARE FAILURE | AP-S |
| DB SOFTWARE FAILURE | DB-S |

FIG. 5

161 DESTINATION TABLE

| FAILURE CAUSE | DESTINATION |
|---|---|
| Web HARDWARE FAILURE | RELATED GROUP 1 |
| AP HARDWARE FAILURE | RELATED GROUP 2 |
| DB HARDWARE FAILURE | RELATED GROUP 3 |
| Web SOFTWARE FAILURE | RELATED GROUP 4 |
| AP SOFTWARE FAILURE | RELATED GROUP 5 |
| DB SOFTWARE FAILURE | RELATED GROUP 6 |

ADMINISTRATOR A, ADMINISTRATOR B

FIG. 6

251 FILTER RESETTING
REQUEST LOG

| DATE AND TIME | MAIL SOURCE | DETAILS |
|---|---|---|
| 5/25 20:32 | ADMINISTRATOR B | FILTER RESETTING REQUESTED TO ADMINISTRATOR C |
| 5/25 20:50 | ADMINISTRATOR D | FILTER RESETTING COMPLETED |

FAILURE SOURCE SERVER AND MAIL SERVER ADMINISTRATOR ALERT MANAGEMENT PROGRAMS, SYSTEMS, AND METHODS

CROSS-REFERENCE TO RELATED APPLICATIONS

This application is a continuing application, filed under 35 U.S.C. §111(a), of International Application PCT/JP2006/323541, filed Nov. 27, 2006.

FIELD

The embodiment discussed herein is related to a server management program, system, and method, and a mail server management program.

BACKGROUND

There is a known mail system which notifies a system administrator (hereinafter, simply referred to as administrator) of a failure via an email (hereinafter, simply referred to as mail) if the failure occurs in a Web service system.

Such mail systems include a system which sets a different administrator as a destination of a mail depending on a failure state (for example, refer to Japanese Laid-open Patent Publication No. 2002-236576).

FIG. 17 illustrates an outline of a Web service system in related art.

A Web service system 90 illustrated in FIG. 17 manages a correspondence between failure details and administrators by using a destination table 92 stored in a management server 91. If a failure occurs, the management server 91 consults the destination table 92 to distribute an alert mail via a mail server 93 and the Internet 80. Referring to FIG. 17, the destination table 92 specifies administrators A to D who are to be informed if a hardware failure or a software failure occurs in any of Web servers 94, application (AP) servers 95, and database (DB) servers 96 which are managed by the management server 91. The administrators to be informed can be changed by updating the destination table 92, which is stored in the management server 91. In general, this update is performed by the administrator of the management server 91.

In recent years, a system to be managed has become more complicated. Therefore, interactions between hardware and middleware components or between middleware components are more likely to cause a failure. Therefore, if such a failure occurs, it is necessary to inform not only administrators who are directly related to the failure (administrators set in the destination table) but also administrators who are possibly related to it.

If a conventional mail notification technique is adapted to handle such a failure, an alert mail is sent to all of possibly related administrators including actually unrelated administrators, which significantly increases the amount of mails to be sent to the administrators. In addition, as the administrators may receive many alert mails with their own personal computers (PCs), they need to depend on a mailer function to select and extract relevant mails from many incoming mails. With popularization of mail communications with portable telephone services, services of sending alert mails to portable telephones are more used. The portable telephones are provided with an incoming call notification function such as ringing, lightening, vibrating, so that they will be made good use of as communication terminals for 24-hour system management or fast troubleshooting.

However, if the above-described technique is adapted by using the portable telephone services, alert mails are also sent to administrators who are not directly related to failures, which causes important alert mails to be mixed with many other mails. This may be because the mailers of the portable telephones have a simpler reception function than those of personal computers, and therefore their mail browsing functions and operability may not be satisfactory. Especially, if an incoming call notification is made for every failure (notification requirement), the administrator may have a lack of concern for alert mails, which results in a delay of troubleshooting.

SUMMARY

According to an aspect of the embodiment, a server management system for notifying an administrator of a failure occurring in a system includes: a management server which includes a source determination unit which determines as a source a symbol identifying a failure cause of the system according to the failure cause, and an alert mail creator which creates an alert mail with the source and with a system administrator of the system as a destination; and a mail server which sends the alert mail to a terminal device that the system administrator uses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a source table;
FIG. 6 illustrates a destination table;
FIG. 14 illustrates a filter resetting request log.

DESCRIPTION OF EMBODIMENT(S)

Figure 1:
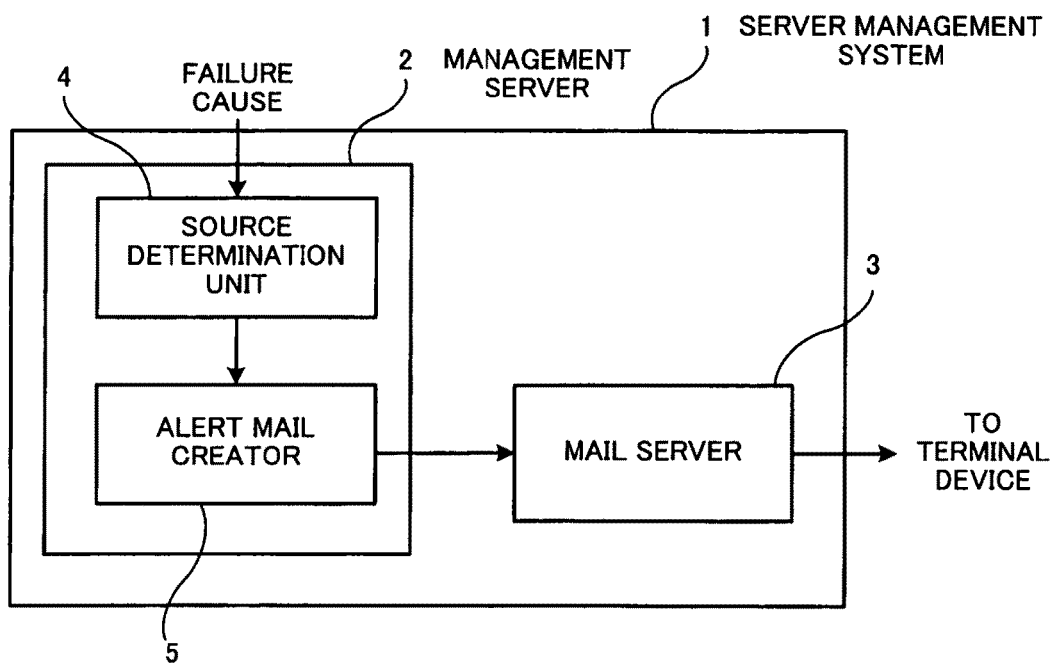
FIG. 1 illustrates an outline of one embodiment.

A preferred embodiment of the present invention will be explained below with reference to the accompanying drawings, wherein like reference numerals refer to like elements throughout.

FIG. 1 illustrates an outline of one embodiment.

A server management system 1 illustrated in FIG. 1 has a management server 2 and a mail server 3.

The management server 2 has a source determination unit 4 and an alert mail creator 5.

The source determination unit 4 determines as a source a symbol identifying a failure cause of a system according to the failure cause. The symbol here may be a letter (string), a numerical (string), a code, etc. This symbol may be acquired from another device or may be extracted from a prepared table or the like by the source determination unit 4.

The alert mail creator 5 creates an alert mail with the determined source and with the system administrator of the system as a destination. The system administrator set here as the destination is not limited to one who is directly related to the failure cause.

The mail server 3 sends the alert mail to a terminal device that the system administrator uses. The terminal device may be a personal computer (PC) or a portable terminal.

According to such a server management system 1, the source determination unit 4 determines as a source a symbol identifying a failure cause of a system according to the failure cause. The alert mail creator 5 creates an alert mail with the determined source and with the system administrator as a destination. Then, the mail server 3 sends the alert mail to the terminal device that the system administrator uses.

FIG. 1 illustrates a situation where the failure cause is directly input to the source determination unit. However, the failure cause may be input to the source determination unit via the alert mail creator.

The embodiment will now be specifically described.

Figure 2:
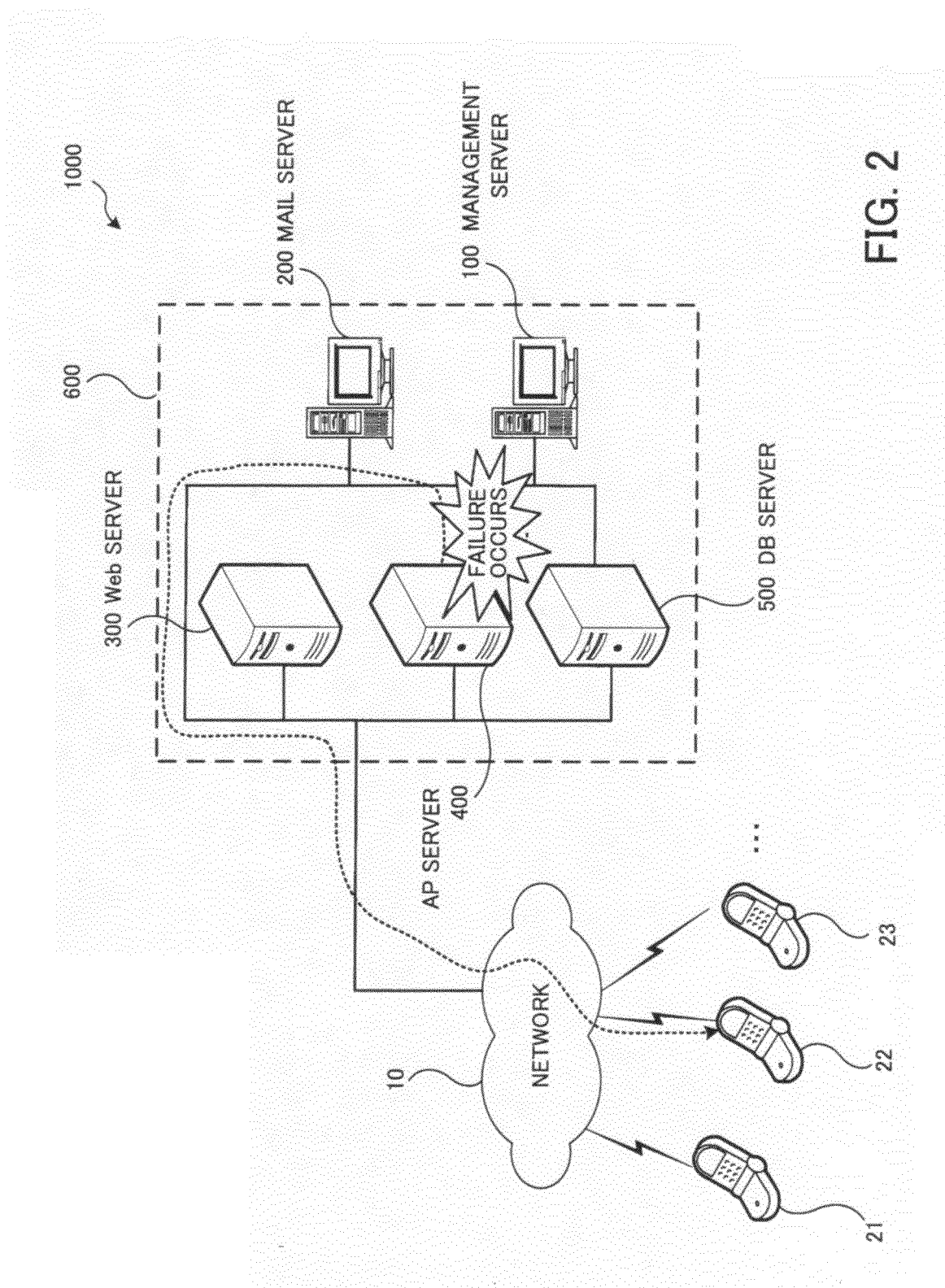
FIG. 2 is a block diagram of a server management system according to the embodiment.

FIG. 2 is a block diagram of a server management system according to the embodiment.

The server management system 1000 has a Web service system 600 formed of a management server 100, a mail server 200, and managed servers (in FIG. 2, a Web server 300, an application (AP) server 400, and a database (DB) server 500) which are managed by the management server 100, and a plurality of portable terminals (in FIG. 2, portable terminals 21, 22, 23, . . . ) connected to the Web service system 600 over a network (for example, the Internet) 10.

If a failure occurs in any (in FIG. 2, the application server 400) of the Web server 300, the application server 400, and the database server 500, the management server 100 creates an alert mail to notify the system administrator of the server management system 1000 of the failure and its cause.

The mail server 200 sends the alert mail created by the management server 100 to the portable telephone that the system administrator uses.

Figure 3:
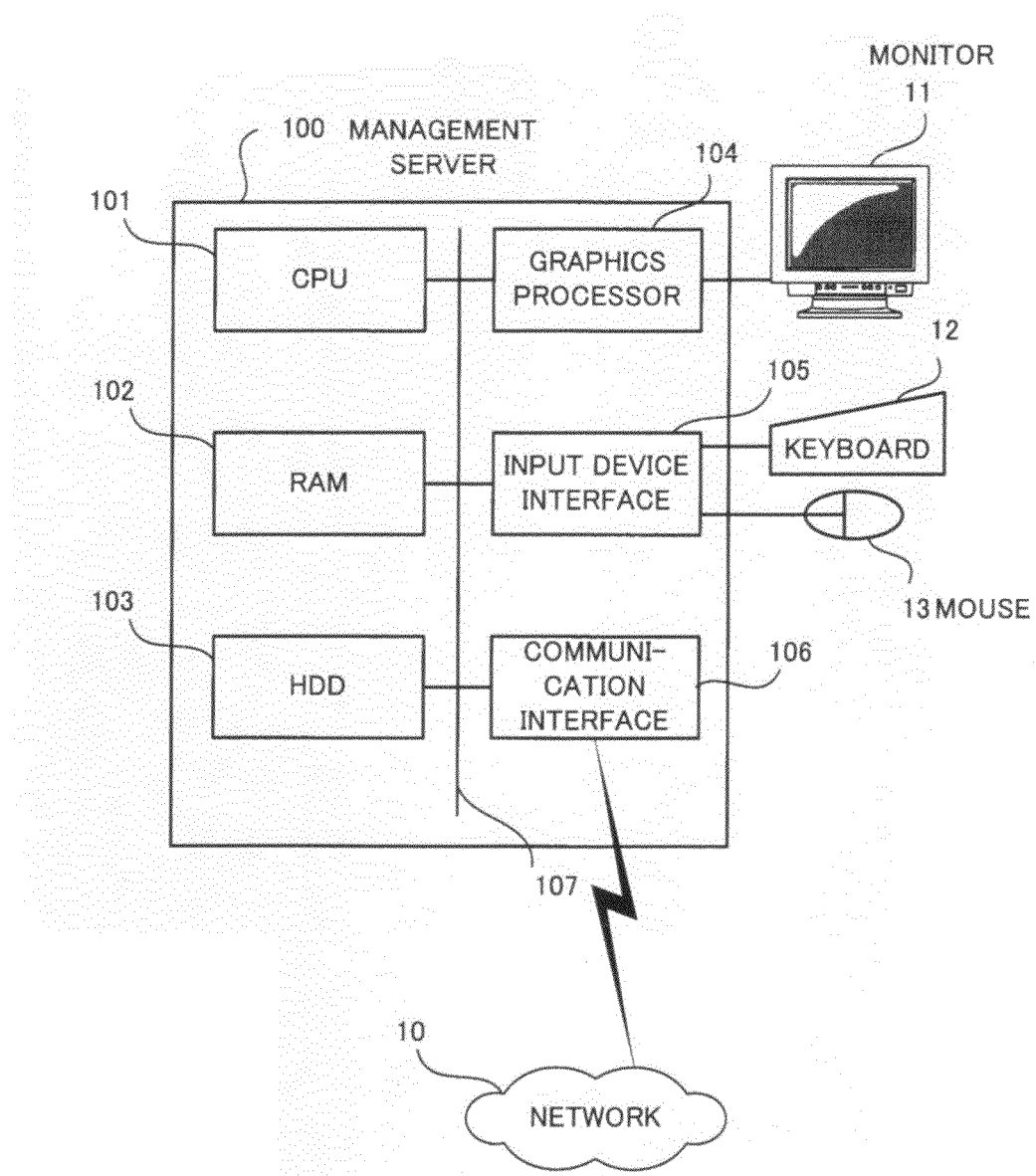
FIG. 3 illustrates an example hardware configuration of a management server.

FIG. 3 illustrates an example hardware configuration of the management server.

The management server 100 is entirely controlled by a Central Processing Unit (CPU) 101. Connected to the CPU 101 via a bus 107 are a Random Access Memory (RAM) 102, a Hard Disk Drive (HDD) 103, a graphics processor 104, an input device interface 105, and a communication interface 106.

The RAM 102 temporarily stores at least part of the Operating System (OS) and application programs to be executed by the CPU 101. In addition, the RAM 102 stores various kinds of data for CPU processing. The HDD 103 stores the OS and application programs, and also stores program files.

The graphics processor 104 is connected to a monitor 11 and is designed to display images on the screen of the monitor 11 under the control of the CPU 101. The input device interface 105 is connected to a keyboard 12 and a mouse 13, and is designed to transfer signals from the keyboard 12 and the mouse 13 to the CPU 101 via the bus 107.

The communication interface 106 is connected to the network 10, and is designed to communicate data with other computers over the network 10.

With the above hardware configuration, the processing functions of the embodiment can be realized. Although FIG. 3 illustrates the hardware configuration of the management server 100, the mail server 200 can be realized with the same hardware configuration. To perform the server management in the server management system 1000 configured as described above, the management server 100, the mail server 200, and the portable terminals 21, 22, 23, . . . are provided with the following functions.

Figure 4:
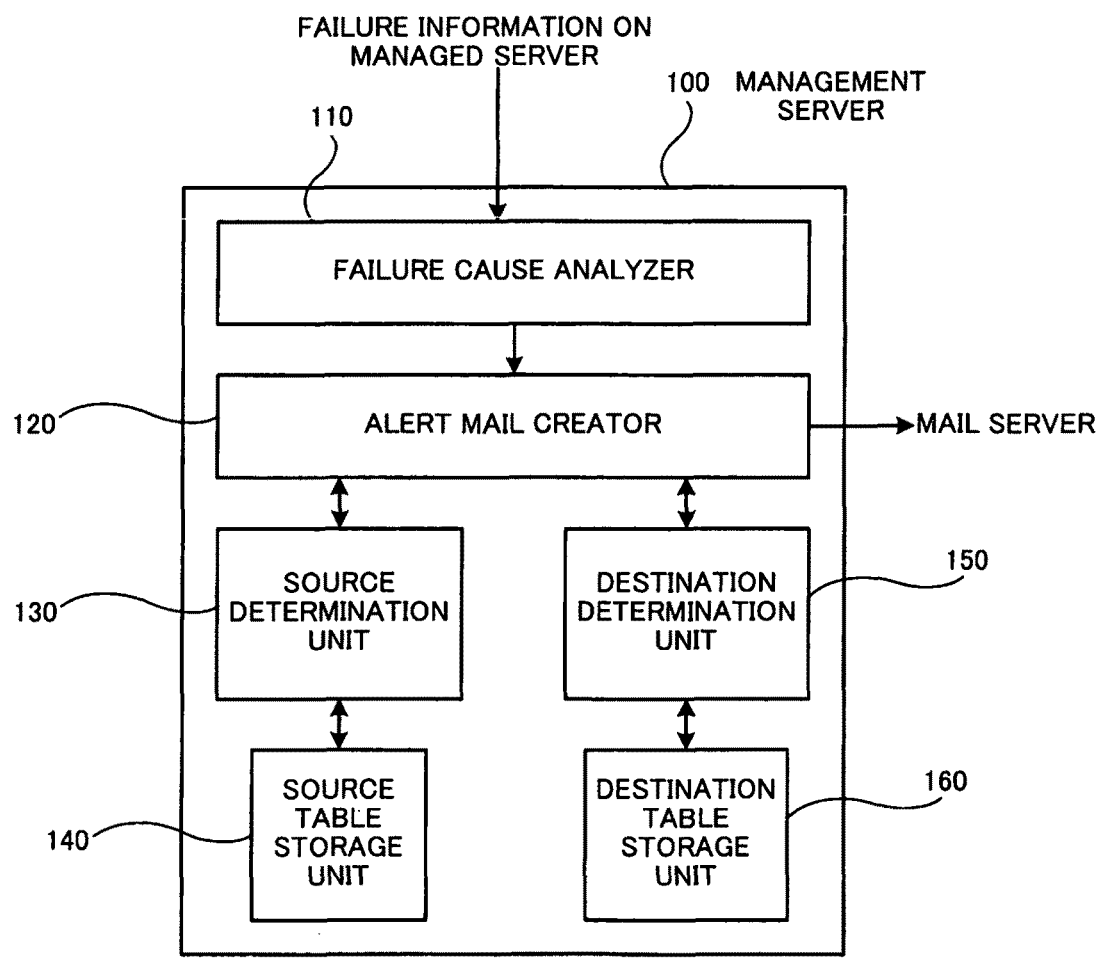
FIG. 4 is a functional block diagram of the management server.

FIG. 4 is a functional block diagram of the management server.

The management server 100 has a failure cause analyzer 110, an alert mail creator 120, a source determination unit 130, a source table storage unit 140, a destination determination unit 150, and a destination table storage unit 160.

The failure cause analyzer 110 receives failure information indicative of a failure occurring in a managed server, that is, the Web server 300, the application server 400, or the DB server 500, and detects the failure cause.

The alert mail creator 120 creates an alert mail when a failure occurs. At this time, the alert mail creator 120 acquires a source for the alert mail from the source determination unit 130, and also acquires a destination for the alert mail from the destination determination unit 150.

The source determination unit 130 consults a source table stored in the source table storage unit 140 to determine the source (source address) for the alert mail.

The source table storage unit 140 stores the source table associating failure causes with sources.

FIG. 5 illustrates the source table.

The source table 141 has columns for failure cause and source. Information items arranged in a row are associated with each other.

The failure cause column contains an item which specifies a failure cause.

The source column contains a source (From) corresponding to the failure cause. Referring to FIG. 5, for example, WEB-H (hardware) is a source if a Web hardware failure occurs, and AP-S (software) is a source if an application software failure occurs. This enables an administrator to specify a failure cause immediately.

Accordingly, a failure cause can be specified by confirming the source of an alert mail, so that an administrator who receives the alert mail can easily determine how to set the mail filter function of his portable telephone 21, 22, 23 (whether to select and receive subsequent mails from the source).

Referring back to FIG. 4, the destination determination unit 150 consults a destination table stored in the destination table storage unit 160 to determine the destination (destination address) for the alert mail.

The destination table storage unit 160 stores the destination table associating failure causes with destinations.

FIG. 6 illustrates the destination table.

The destination table 161 has columns for failure cause and destination. Information items arranged in a row are associated with each other.

The failure cause column contains the same items as the source table 141.

The destination column contains a related group of administrators who are considered to be related, directly or possibly, to a corresponding failure. For example, a related group 1 includes an administrator A and an administrator B. An administrator can belong to a plurality of related groups.

For example, if a hardware failure occurs in the application server 400, an alert mail with a source of "AP-H" and a destination of "related group 2" is created based on the tables of FIGS. 5 and 6.

Figure 7:
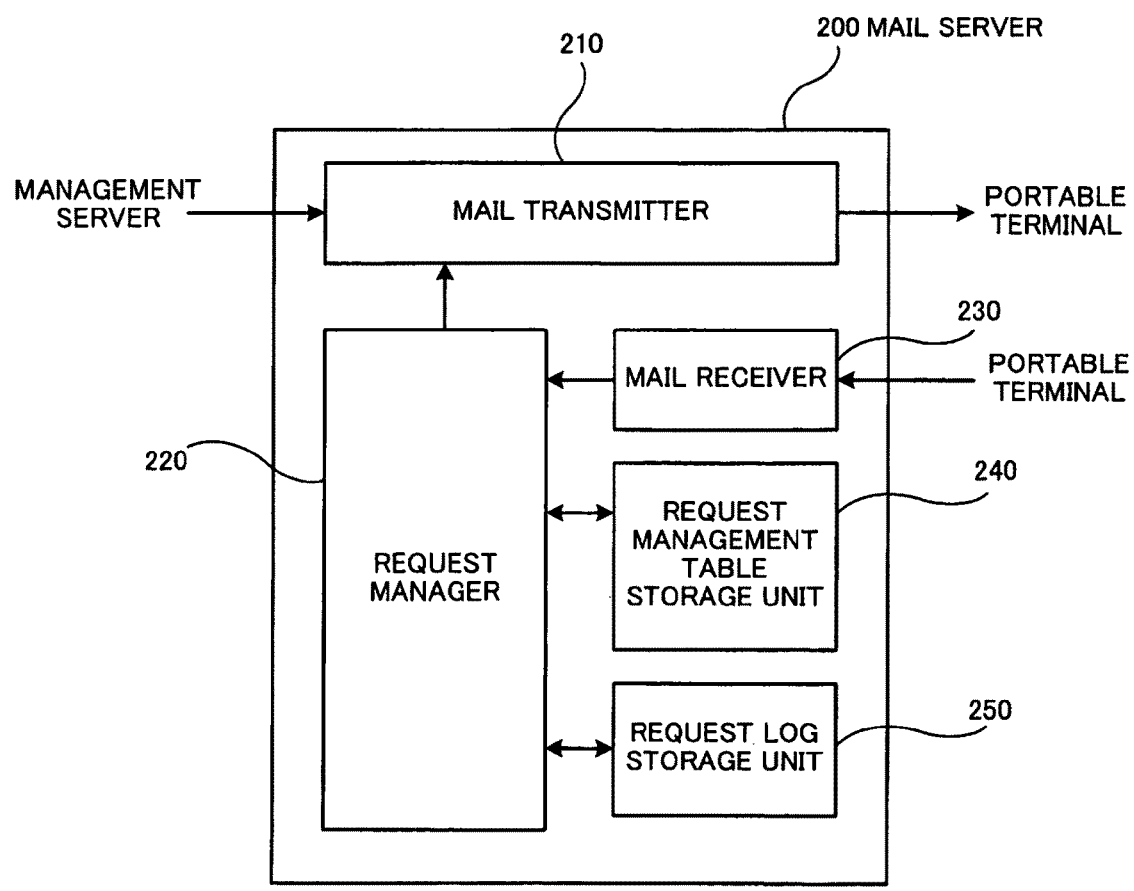
FIG. 7 is a functional block diagram of a mail server.

FIG. 7 is a functional block diagram of the mail server.

The mail server 200 has a mail transmitter 210, a request manager 220, a mail receiver 230, a request management table storage unit (request management section) 240, and a request log storage unit 250.

The mail transmitter 210 sends mails such as alert mails to the portable terminals that a related group set as a destination uses.

The request manager 220 manages the progress of filter resetting which other administrators perform in response to a filter resetting request made by the portable terminal of an administrator who received an alert mail. The filter resetting request and the filter resetting will be described in detail later.

The mail receiver 230 is provided with a function of receiving mails from the portable terminals 21, 22, 23, . . . .

The request management table storage unit 240 stores a request management table for managing the progress of the filter resetting. The request management table will be described in detail later.

The request log storage unit 250 manages filter resetting request logs concerning the filter resetting. The filter resetting request logs will be described in detail later.

The main functions of the portable terminals 21, 22, 23, . . . will now be described. Since the portable terminals 21, 22, 23, . . . have the same functions, the configuration of the portable terminal 21 will be described by way of example.

Figure 8:
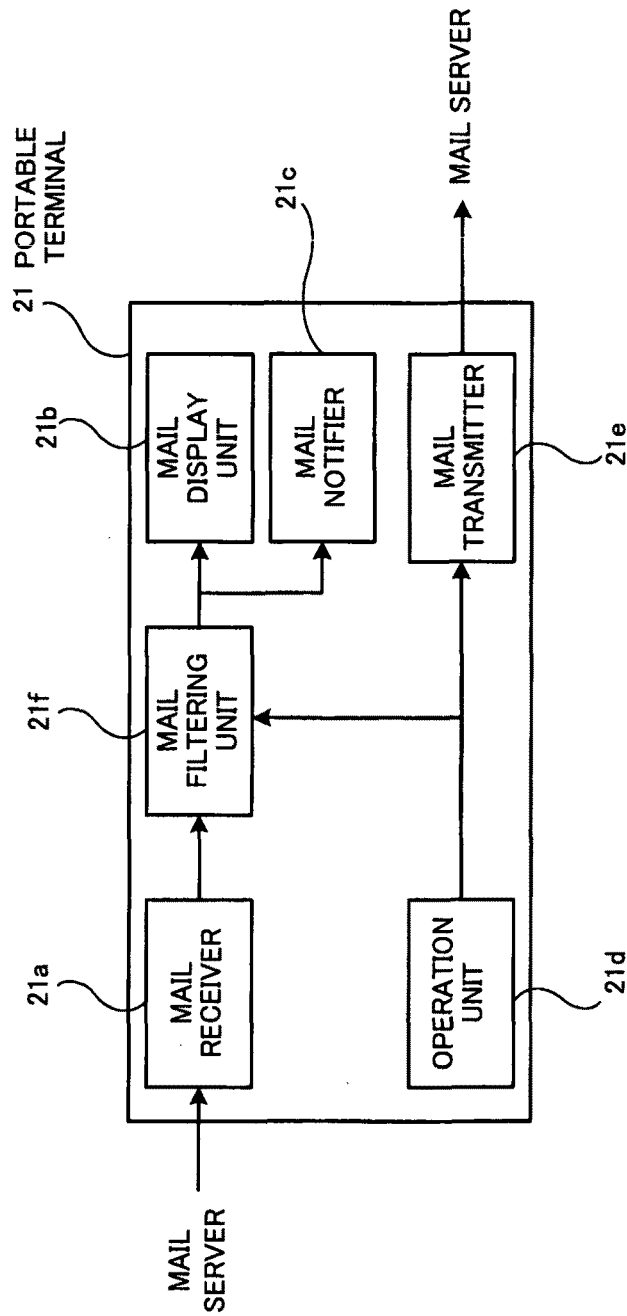
FIG. 8 is a functional block diagram of a portable terminal.

FIG. 8 is a functional block diagram of the portable terminal.

The portable terminal 21 has a mail receiver 21a, a mail display unit 21b, a mail notifier 21c, an operation unit 21d, a mail transmitter 21e, and a mail filtering unit 21f.

The mail receiver 21a has a function of receiving mails from the mail server 200, etc.

The mail display unit 21b has a display screen for displaying the source, destination, subject, contents, etc. of a received mail.

When a mail arrives, the mail notifier 21c notifies the administrator of the mail arrival by ringing, vibrating, or lightening.

The operation unit 21d has a dial key, cross keys, etc., and is designed to accept letters or mail sending commands which are entered by an administrator for various setting, confirmation of setting, and creation of a mail.

The mail transmitter 21e sends a mail created by the administrator to the mail server 200 in response to a mail sending command made by the administrator.

The mail filtering unit 21f monitors incoming and outgoing mails to automatically select, pass, or block mails of specified kinds. The setting for the passing and blocking can be done with the operation unit 21d.

In this embodiment, the portable terminal 21 is provided with the mail filtering unit 21f. However, such a mail filtering unit 21f may be provided in the mail server 200 to monitor mails passing through the mail server 200.

In the following explanation, in a similar way to the portable terminal 21, reference numerals are given to the portable terminal 22 and the portable terminal 23. For example, the mail receiver of the portable terminal 22 is given reference numeral 22a.

The following describes how the management server 100 performs an alert mail sending process to send an alert mail to the mail server 200.

Figure 9:
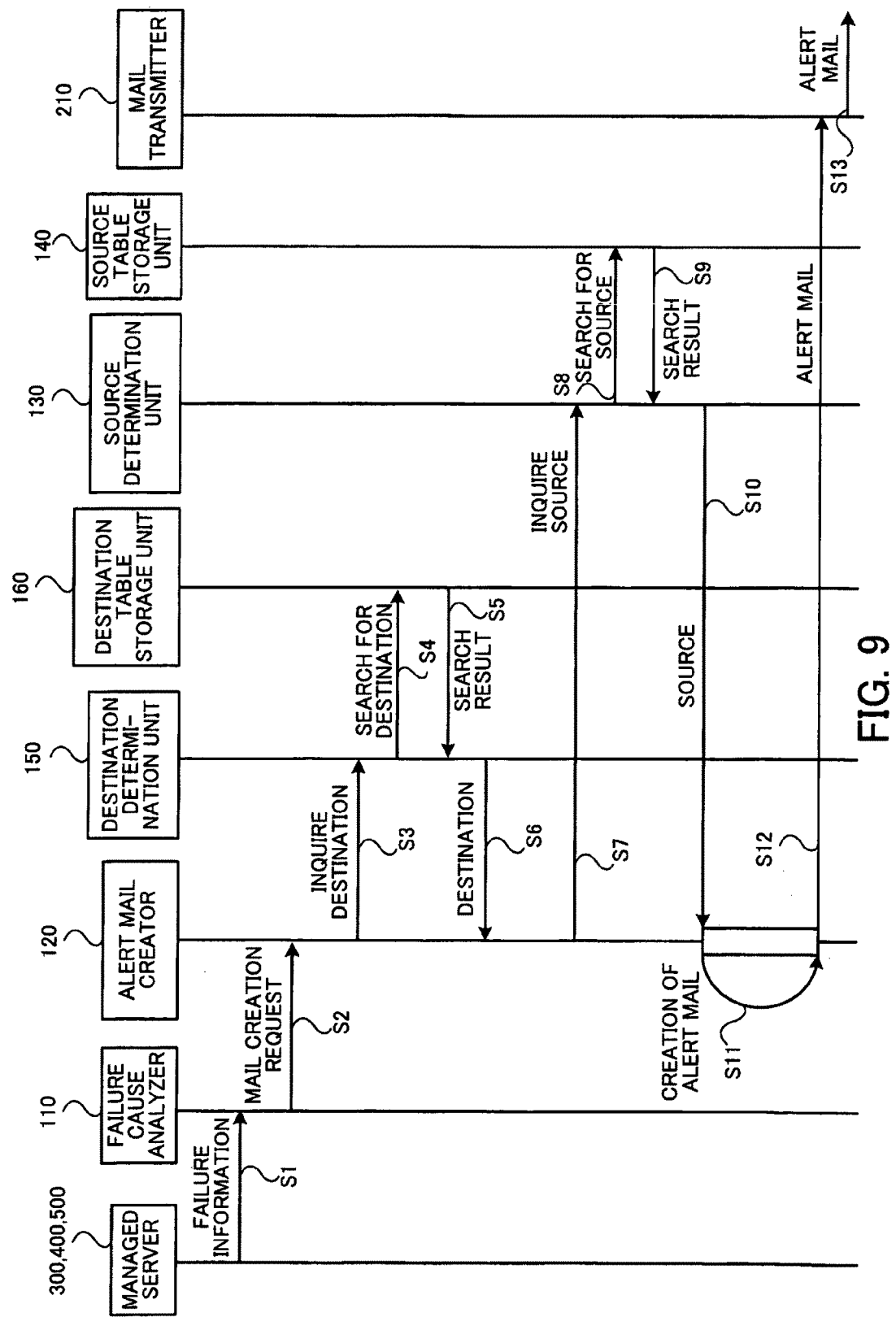
FIG. 9 describes a sequence of an alert mail sending process.

FIG. 9 describes a sequence of the alert mail sending process.

When the failure cause analyzer 110 receives failure information from a managed server (step S1), the failure cause analyzer 110 detects a failure cause, and gives a mail creation request to the alert mail creator 120 to create an alert mail corresponding to the failure cause (step S2).

Then, the alert mail creator 120 inquires to the destination determination unit 150 about a destination (step S3).

Then, the destination determination unit 150 searches the destination table 161 in the destination table storage unit 160 (step S4), and obtains a destination (step S5).

Then, the destination determination unit 150 notifies the alert mail creator 120 of the destination (step S6).

Then, the alert mail creator 120 inquires to the source determination unit 130 about a source (step S7).

Then, the source determination unit 130 searches the source table 141 in the source table storage unit 140 (step S8), and obtains a source (step S9).

The source determination unit 130 notifies the alert mail creator 120 of the source (step S10).

Then, the alert mail creator 120 creates an alert mail with the source and the destination (step S11).

Then, the alert mail creator 120 sends the alert mail to the mail transmitter 210 (step S12).

Then, the mail transmitter 210 sends the alert mail to the destination (step S13).

Now, the alert mail sending process is completed.

Figure 10:
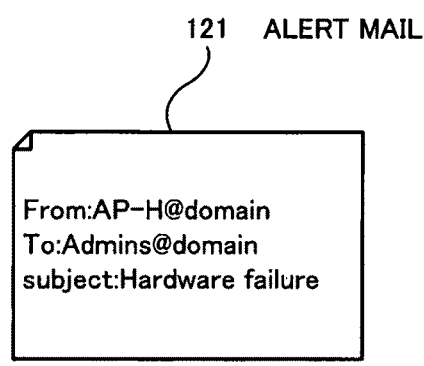
FIG. 10 illustrates an example of the contents of an alert mail.

FIG. 10 illustrates an example of the contents of an alert mail.

In the alert mail 121, "AP-H@domain", "Admins@domain", and "Hardware failure" are set as a source (From), a destination (To), and subject, respectively. From these information (especially only the source), recipients can know its contents without opening the mail.

By the way, as described before, in recent years, more complicated systems are managed. Therefore, interactions between hardware and middleware components or between middleware components are more likely to cause a failure. For such a failure, an alert mail needs to be sent not only to directly related administrators but also to possibly related administrators. In this embodiment, the mail server 200 is designed to perform a filter resetting process where a filter resetting request is made to each possibly related administrator to change the setting of the mail filtering unit of the portable terminal of the possibly related administrator.

The filter resetting process will now be described.

Figure 11:
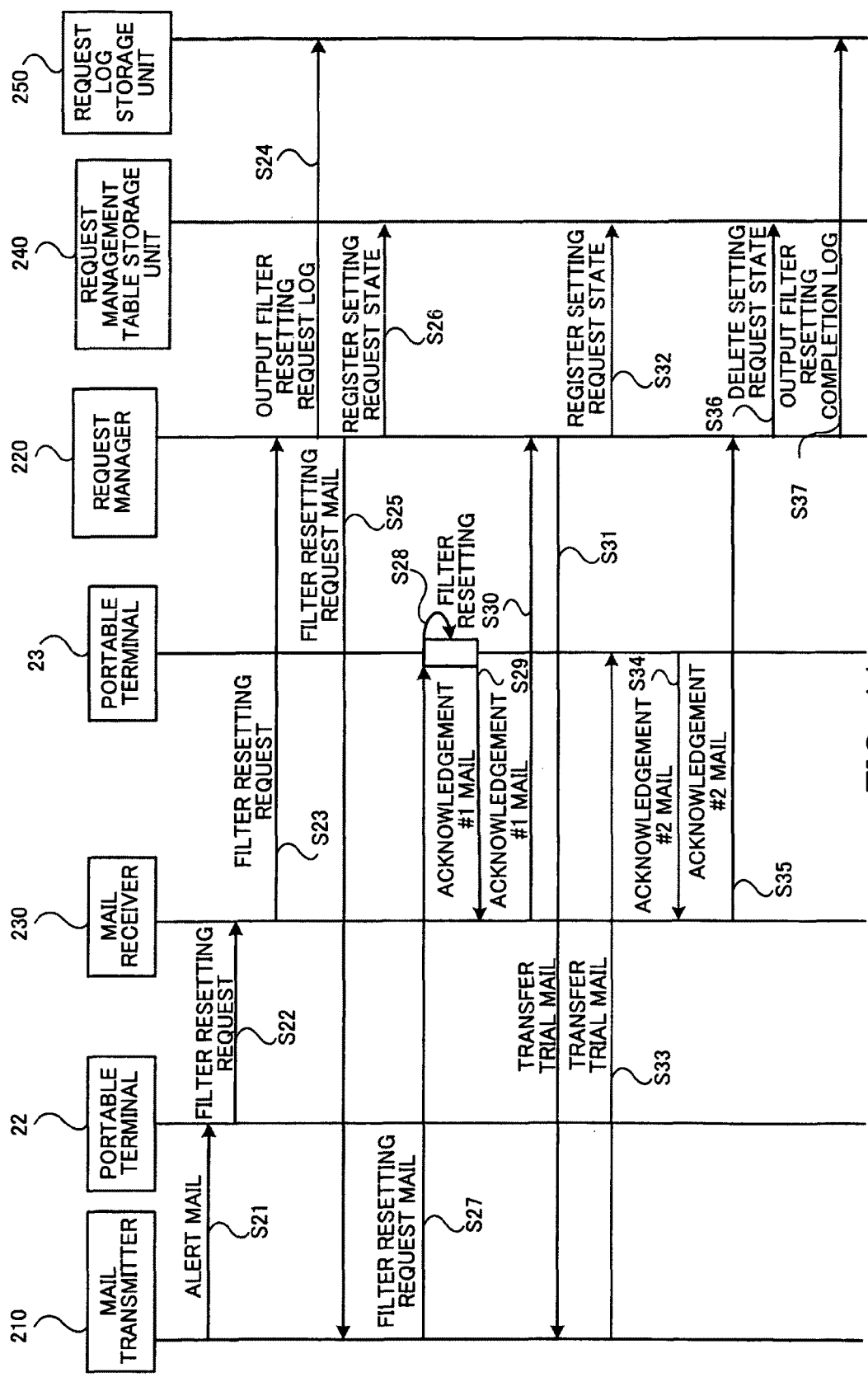
FIG. 11 describes a sequence of a filter resetting process.

FIG. 11 describes a sequence of the filter resetting process.

FIG. 11 describes a case, as an example, where, after a mail is distributed to every person of a related group, the administrator B (directly related administrator) who received the alert mail 121 illustrated in FIG. 10 requests the administrator C (possibly related administrator) to perform the filter resetting.

In this explanation, it is assumed that the administrators B and C use portable terminals 22 and 23, respectively.

In addition, it is assumed that only the portable terminal 22 of the administrator B, who is a directly related administrator of the related group, has the mail filtering unit 22f set to a mail reception state. In other words, the portable terminal 23 of the administrator C has the mail filtering unit 23f so set as to block the alert mail 121.

First, at the time of the above-described alert mail sending process, the mail transmitter 210 sends the alert mail 121 to the portable terminal 22 (step S21).

When the mail receiver 22a of the portable terminal 22 receives the alert mail 121, an arrival notification is displayed on the mail display unit 22b, and the mail notifier 22c notifies the administrator B of the arrival of the alert mail 121. The administrator B manipulates the operation unit 22d to send a filter resetting request (mail) for the administrator C to the mail server 200 (step S22). The filter resetting request is created and sent by filling in specified items of a predetermined form. Thereby, the request manager 220 can confirm the filter resetting request.

Upon reception of the filter resetting request from the portable terminal 22, the mail receiver 230 of the mail server 200 gives the filter resetting request to the request manager 220 (step S23).

Then, the request manager 220 outputs a filter resetting request log to the request log storage unit 250 (step S24), creates and sends a filter resetting request mail to the mail transmitter 210 (step S25), and registers (adds) a setting request state including "administrator B" as a requester, "administrator C" as a transfer destination, and "filter resetting being requested" as a state in the request management table 241 (step S26). The order of steps S24 to S26 is not limited.

Figure 12:
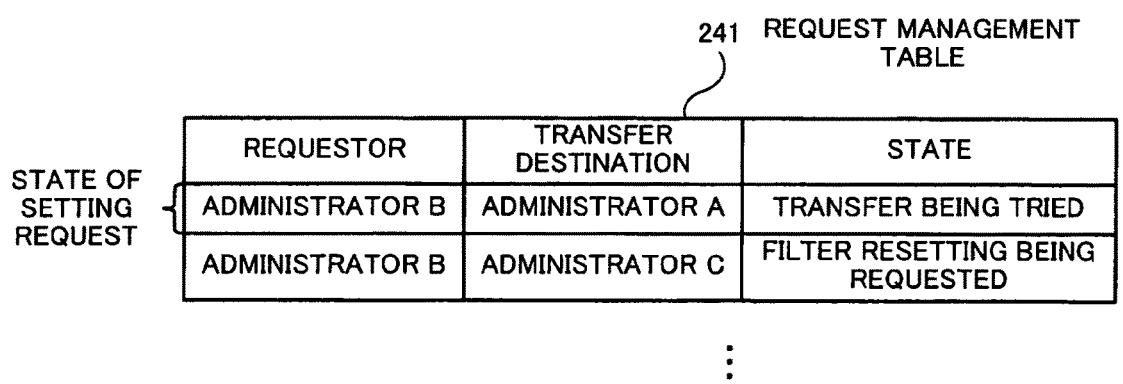
FIG. 12 illustrates a request management table.

FIG. 12 illustrates the request management table.

The request management table 241 has columns for requester, transfer destination, and state. Information items arranged in a row are associated with each other.

The requestor column contains an administrator who made a filter resetting request.

The transfer destination column contains an administrator which is to perform the filter resetting in response to the filter resetting request.

The state column contains a current state of the administrator who is to perform the filter resetting.

Referring back to FIG. 11, next, the mail transmitter 210 sends the filter resetting request mail to the portable terminal 23 (step S27).

Figure 13:
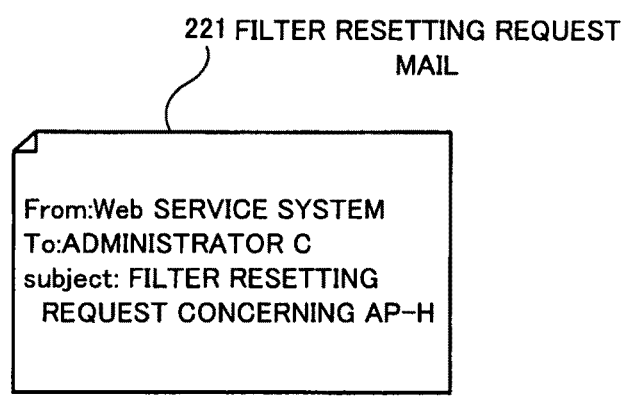
FIG. 13 illustrates an example of a filter resetting request mail.

FIG. 13 illustrates an example of the filter resetting request mail.

The filter resetting request mail 221 has "Web service system" as a source (From), "administrator C" as a destination (To), and "filter resetting request concerning AP-H" as a subject.

Referring back to FIG. 11, when the mail receiver 23a of the portable terminal 23 receives the filter resetting request mail, an arrival notification is displayed on the mail display unit 23b, and the mail notifier 23c notifies the administrator C of the arrival of the mail. The administrator C manipulates the operation unit 23d to perform the filter resetting on the mail filtering unit 23f (step S28), and sends an acknowledgement #1 mail indicative of acknowledgement of the filter resetting request mail to the mail server 200 (step S29).

Upon reception of the acknowledgement #1 mail, the mail receiver 230 of the mail server 200 gives this mail to the request manager 220 (step S30).

The request manager 220 sends the mail transmitter 210 a transfer trial mail with "AP-H" as a source and with the administrator C as a destination for confirming the setting of the mail filter (step S31), and also registers (adds) a setting request state including "administrator B" as a requester, "administrator C" as a transfer destination, and "transfer being tried" as a state (step S32).

Upon reception of the transfer trial mail, the mail transmitter 210 sends it to the portable terminal 23 (step S33).

When the mail receiver 23a of the portable terminal 23 receives the transfer trial mail, an arrival notification is displayed on the mail display unit 23b, and the mail notifier 23c notifies the administrator C of the arrival of the mail. The administrator C manipulates the operation unit 23d to send an acknowledgement #2 mail indicative of acknowledgement of the transfer trial mail to the mail server 200 (step S34).

Upon reception of the acknowledgement #2 mail, the mail receiver 230 of the mail server 200 gives this mail to the request manager 220 (step S35).

Upon reception of the acknowledgement #2 mail, the request manager 220 deletes the setting request states registered in the request management table 241 at steps S26 and S32 (step S36), and outputs a filter resetting completion log to the request log storage unit 250 (step S37).

After receiving the acknowledgement #2 mail, the request manager 220 may send a filter resetting completion notification to the administrator B.

FIG. 14 illustrates the filter resetting request log.

The filter resetting request log 251 has columns for date and time, mail source, and details. Information items arranged in a row are associated with each other.

The date and time column contains a date and time when an action occurred.

The mail source column contains an administrator who made a filter resetting request or an administrator who sent an acknowledgement #2 mail.

The details column describes the action made by the mail source.

FIG. 14 indicates an action that a filter resetting request was made from the administrator B to the administrator C at 20:32 on May 25, and also indicates an action that the filter resetting of the administrator D was completed at 20:50 on the same day.

As described above, in the server management system 1000 according to the embodiment, the source determination unit 130 consults the source table 141 to determine a source associated with a failure, and the alert mail creator 120 creates an alert mail with the source. Therefore, an administrator can specify a failure cause by confirming the source address, and also can easily determine whether the mail is of high importance or not. This assures a definite response from the administrator.

In addition, the destination determination unit 150 consults the destination table 161 to determine a destination, and the alert mail creator 120 creates an alert mail with this destination. Therefore, destinations can be narrowed down to some extent, and an administrator can easily determine whether the mail is of high importance or not.

Further, if a related group has an administrator (administrator B) whose mail filtering unit has been set to a mail reception state and an administrator (administrator C) whose mail filtering unit has not been set to the mail reception state, the destination table does not need updating. The administrator B just sends a filter resetting request, so that the portable terminal 23 of the administrator C is set to the mail reception state.

In addition, after the administrator B makes the filter resetting request for the administrator C, the filter resetting of the administrator C is managed by the request manager 220, which reduces a load on the administrator B.

Further, the request manager 220 manages the states of filter resetting requests by using the request management table 241, so that the correspondence between a requestor and a transfer destination, and the progress of mail filter resetting can be easily and surely confirmed.

In addition, data in the request management table 241 can be updated easily, as compared with the source table 141 and the destination table 161, which reduces a management load.

Still further, the request manager 220 sends a transfer trial mail to the portable terminal 23 after receiving an acknowledgement #1 mail, and receives an acknowledgement #2 mail, so that it is easily and surely confirmed that an alert mail will arrive at the administrator C.

Still further, the request manager 220 records logs in the request log storage unit 250 when receiving a filter resetting request and receiving an acknowledgement #2 mail. Therefore, it can be specified what causes a notification trouble between administrators if occurs, for example.

In this embodiment, a destination is determined based on the destination table. Alternatively, the system administrator of the server management system 1000 may be set as a destination.

By the way, if an acknowledgement #1 mail is not returned from the administrator C within a predetermined period of time in the filter resetting process, the mail server 200 performs the following process (request re-sending process).

The request re-sending process will now be described.

Figure 15:
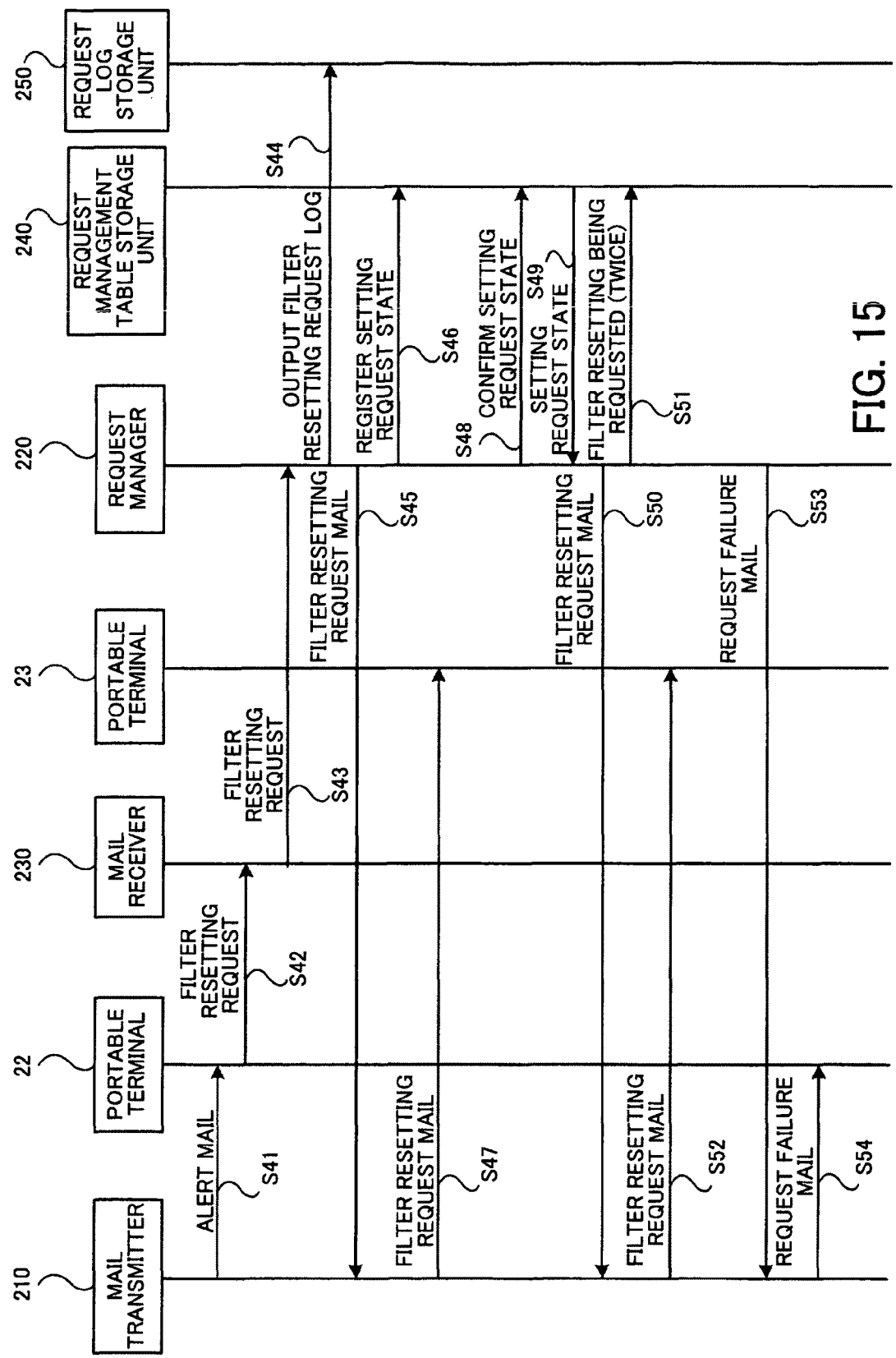
FIG. 15 describes a sequence of a request re-sending process.

FIG. 15 describes a sequence of the request re-sending process.

If the request manager 220 does not receive an acknowledgement #1 mail within a predetermined period of time after steps S41 to 47, which are the same as steps S21 to S27 of FIG. 11, are performed, the request manager 220 confirms a setting request state in the request management table 241 (steps S48 and 49). Then, the request manager 220 sends a filter resetting request mail again to the transfer destination currently requested for the filter resetting, that is, to the administrator C (step S50). Then, the request manager 220 updates the state column to "filter resetting being requested (twice)" (step S51).

The request manager 220 repeats the above steps S48 to S51 a specified number of times or for a specified period of time until receiving an acknowledgement #1 mail from the administrator C. Thereby, the filter resetting request mail is repeatedly sent to the portable terminal 23 a specified number of times or for a specified period of time (step S52).

If the request manager 220 receives an acknowledgement #1 mail at this time, the steps after step S31 of FIG. 11 are performed.

If the request manager 220 does not receive an acknowledgement #1 mail even if the filter resetting request mail is sent the specified number of times or if the specified period of time passes, the request manager 220 creates a request failure mail with the administrator B as a destination, and gives it to the mail transmitter 210 (step S53).

The mail transmitter 210 sends the request failure mail to the portable terminal 22 (step S54).

Thereby, the administrator B making the filter resetting request can know the result of the filter resetting request immediately, so that the administrator B can take another measure (for example, make a telephone call to the administrator C) in order to cope with the failure immediately.

If the request manager 220 does not receive an acknowledgement #2 mail for a predetermined period of time after sending a transfer trial mail, the request manager 220 repeats the same steps as steps S31 to S33 of FIG. 11 a specified number of times or for a specified period of time until receiving the acknowledgement #2 mail, and yet if the request manager 220 does not receive an acknowledgement #2 mail, the request manager 220 may create a request failure mail with the administrator B as a destination, and give it to the mail transmitter 210.

By the way, after sending the filter resetting request, the administrator B can make an inquiry to the mail server 200 to send a list for confirming people who have not completed the resetting.

Now, this process (resetting incomplete people confirmation process) will be described.

Figure 16:
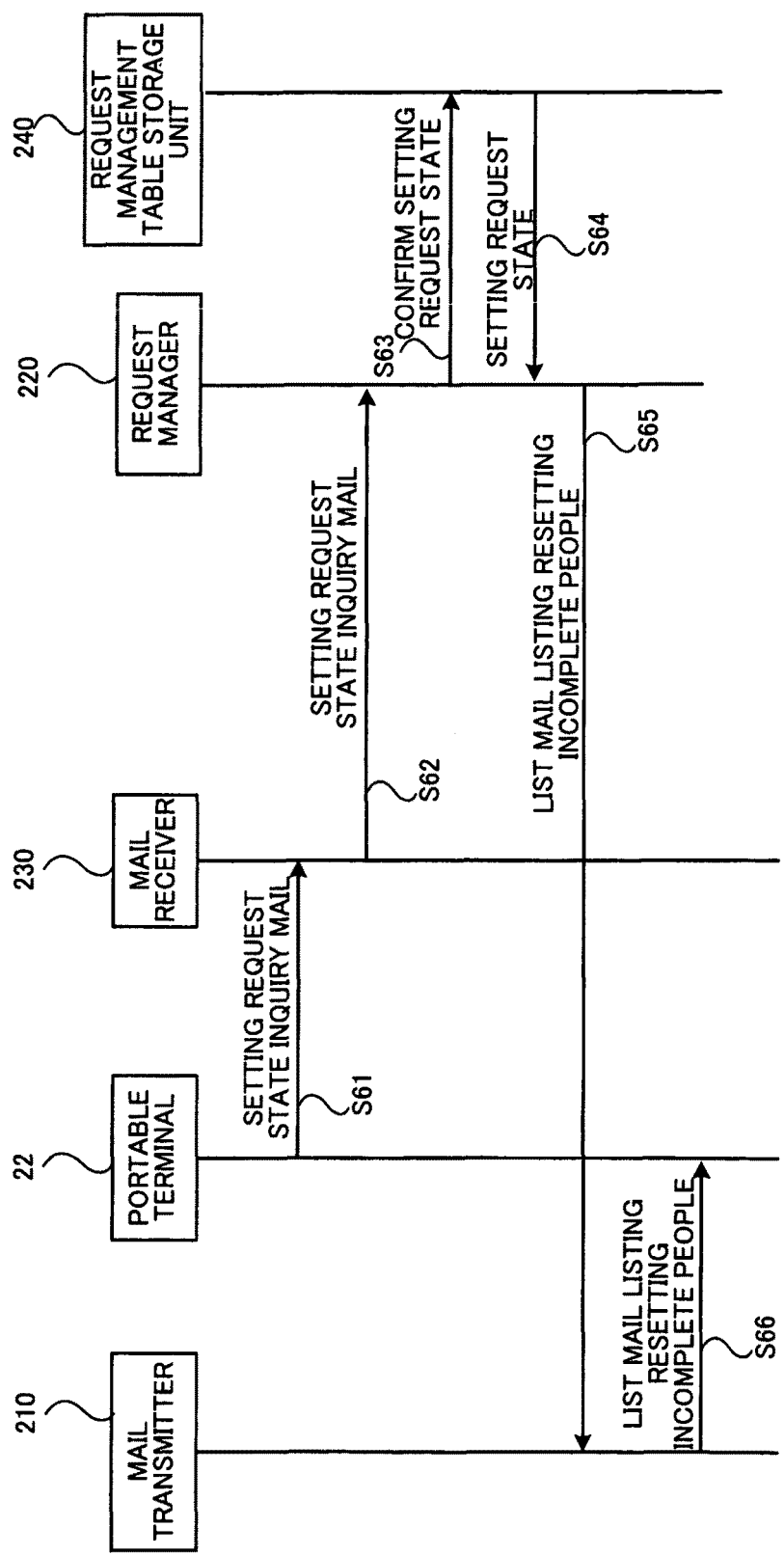
FIG. 16 describes a sequence of a resetting incomplete people confirmation process.
Figure 17:
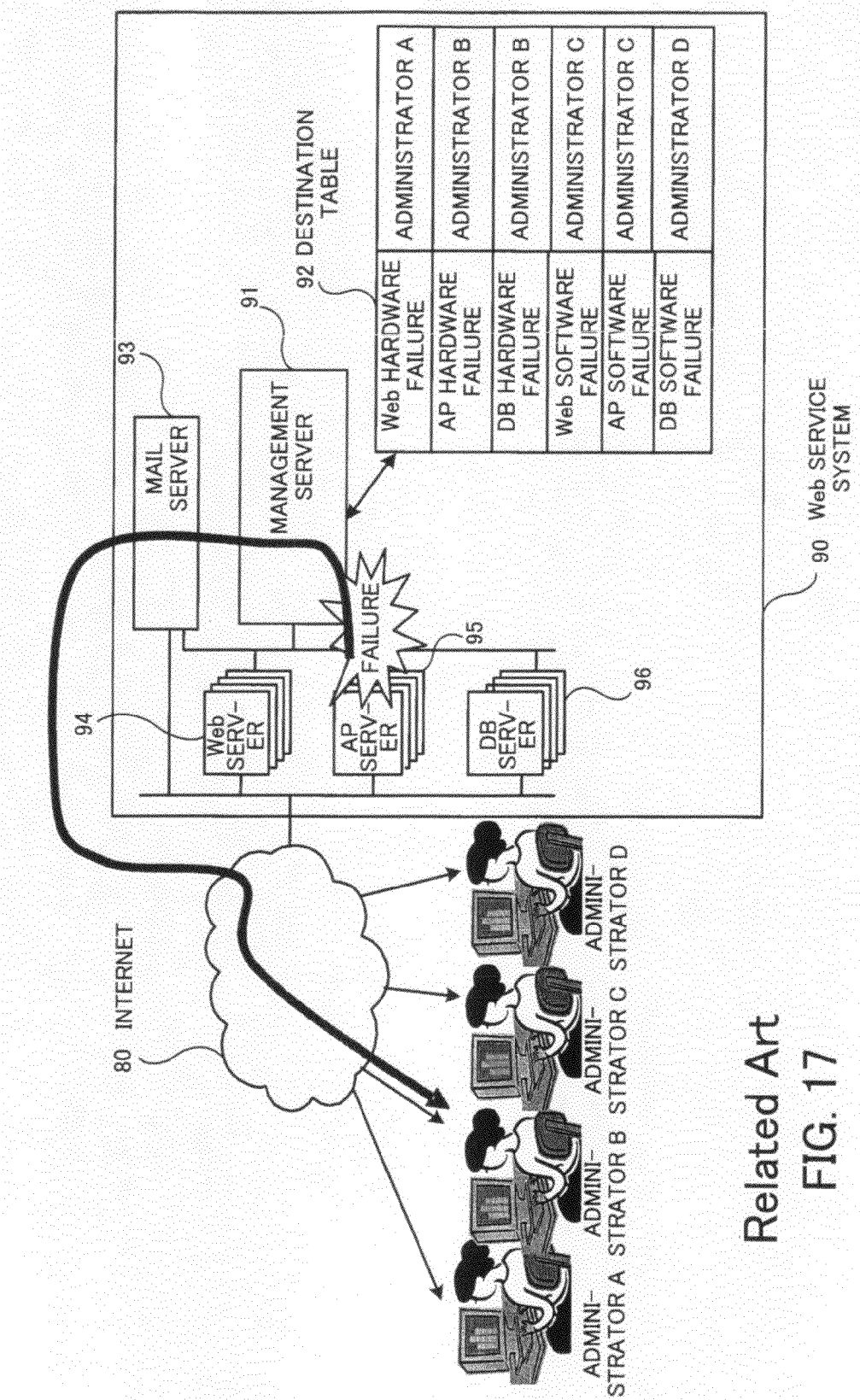
FIG. 17 illustrates an outline of a conventional Web service system in related art.

FIG. 16 describes a sequence of the resetting incomplete people confirmation process.

FIG. 16 does not describe a process which is performed before transmission of a filter resetting request.

First, the administrator B sends a setting request state inquiry mail with the portable terminal 22 (step S61).

Upon reception of the setting request state inquiry mail, the mail receiver 230 gives the mail to the request manger 220 (step S62).

Then, the request manager 220 confirms a setting request state in the request management table 241 (steps S63 and S64), and creates a list mail listing resetting incomplete people, and gives it to the mail transmitter 210 (step S65).

Then, the mail transmitter 210 sends the list mail listing the resetting incomplete people to the portable terminal 22 (step S66).

Thereby, the administrator B can easily and surely know the state of the filter resetting request, that is, the state of the administrator C.

In this embodiment, the portable terminals 21, 22, and 23 are used as terminal devices. Alternatively, stationary terminals such as desktop personal computers (PC) may be used as such terminal devices.

Further, in the embodiment, the mail server 200 is provided with the functions of the request manager 220, the functions of the request management table storage unit 240, the functions of the request log storage unit 250. Alternatively, these functions may be provided in the management server 100.

The processing functions described above can be realized by a general computer. In this case, a program is prepared, which describes processes for the functions to be performed by the management server 100 or the mail server 200. The program is executed by a computer, whereupon the aforementioned processing functions are accomplished by the computer. The program describing the processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes (MT), etc. The optical discs include DVDs (Digital Versatile Discs), DVD-RAMs (Random Access Memory), CD-ROMs (Compact Disc Read-Only Memory), CD-R (Recordable)/RW (ReWritable), etc. The magneto-optical recording media include MOs (Magneto-Optical disk) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the server management program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to the embodiment, an alert mail with a source corresponding to a failure cause is created, so that administrators who receive the alert mail can specify the failure cause by only checking the source. Therefore, the administrators can easily extract mails coming from sources which are related to them, so as to take an immediate action for troubleshooting.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions, and alterations could be made thereto without departing from the spirit and scope of the invention.

What is claimed is:

1. A computer-readable, non-transitory medium storing a mail server management program for notifying an administrator of a failure occurring in a system, the mail server management program causing a computer to perform as:
    a transmitter which sends an alert mail with a source address and with a system administrator's mail address of the system as a destination address to a terminal device that the system administrator uses, the source address being a symbol identifying a failure cause found in the system, the symbol being one of a plurality of symbols representing source addresses which are respectively associated with a plurality of possible failure causes in a source table;
    a receiver which receives a filter resetting request which is sent from the system administrator to request another administrator to perform resetting of a mail filter; and
    a request manager which sends a filter resetting request mail promoting the resetting of the mail filter to the another administrator's mail address and registers a setting request state of the filter resetting request when the receiver receives the filter resetting request, sends a transfer trial mail with the source address, which is the same source address as the alert mail, to the another administrator's mail address when the receiver receives an acknowledgement mail indicating that a terminal device that the another administrator uses completed the resetting of the mail filter, and deletes the setting request state when the receiver receives a response mail to the transfer trial mail.

2. A server management system for notifying an administrator of a failure occurring in a system, the server management system comprising:
    a management server which includes:
    a source table which stores a plurality of symbols representing source addresses, respectively associated with a plurality of possible failure causes,
    a source determination unit which consults the source table to determine, as a source address to be used for alerting, one of the symbols that is associated with a failure cause found in the system, and
    an alert mail creator which creates an alert mail with the source address and with a system administrator's mail address of the system as a destination address; and
    a mail server which sends the alert mail to a terminal device that the system administrator uses,
    the mail server further including a request manager which sends a filter resetting request mail promoting resetting of a mail filter to another administrator's mail address and registers a setting request state of the filter resetting request when receiving a filter resetting request which is sent from the system administrator to request the another administrator to perform resetting of a mail filter, sends a transfer trial mail with the source address, which is the same source address as the alert mail, to the another administrator's mail address when receiving an acknowledgement mail indicating that a terminal device that the another administrator uses completed the resetting of the mail filter, and deletes the setting request state when receiving a response mail to the transfer trial mail.

3. The server management system according to claim 2, wherein:
    the management server further includes a destination determination unit that determines the destination address according to the failure cause; and
    the alert mail creator creates the alert mail with the source address and with the destination address determined by the destination determination unit.

4. The server management system according to claim 2, wherein the mail server further includes a request management section that manages a progress of the resetting of the mail filter of the terminal device that the another administrator uses after receiving the filter resetting request.

5. The server management system according to claim 4, wherein the request manager sends the progress of the resetting of the terminal device that the another administrator uses to the system administrator's mail address based on the request management section when receiving a setting request state inquiry mail from the system administrator for confirming a state of the filter resetting request.

6. The server management system according to claim 2, wherein the mail server further includes a log creator that creates a log when the resetting of the mail filter is requested and creates a log when the setting request state is deleted.

7. The server management system according to claim 2, wherein the request manager sends the another administrator's mail address the filter resetting request mail a plural number of times if not receiving the acknowledgement mail, and sends a request failure mail to the system administrator's mail address if not receiving the acknowledgement mail in response to the filter resetting request mail.

8. The server management system according to claim 2, wherein the terminal device is a portable terminal.

* * * * *